United States Patent
Fletcher et al.

[11] 3,910,257
[45] Oct. 7, 1975

[54] MEDICAL SUBJECT MONITORING SYSTEMS

[76] Inventors: James C. Fletcher, Administrator of the National Aeronautics and Space Administration, with respect to an invention of Garry J. Cleveland, Fremont; George M. Loh, Santa Clara; Robert S. Luce, Los Altos, all of Calif.; Norman Belasco, Houston, Tex.; Marko I. Lipanovich, Los Altos; Howard L. Petersen, Saratoga, both of Calif.; Sam L. Pool, Houston; Donald W. Mangold, Pasadena, both of Tex.

[22] Filed: Apr. 25, 1973

[21] Appl. No.: 354,406

[52] U.S. Cl............ 128/2.1 A; 128/2 H; 128/2.06 R
[51] Int. Cl................................................ A61b 5/00
[58] Field of Search .......... 128/2 H, 2.06 B, 2.06 E, 128/2.06 R, 2.1 A, 2.1 R

[56] References Cited
UNITED STATES PATENTS

| | | | |
|---|---|---|---|
| 3,453,546 | 7/1969 | Fryer | 128/2.1 A |
| 3,603,946 | 9/1971 | Lee | 128/2.1 A |
| 3,646,606 | 2/1972 | Buxton et al. | 128/2.1 A |

OTHER PUBLICATIONS

Skutt et al., "IEEE Transactions on Bio–Medical Engineering," Vol. BME–17, No. 4, Oct. 1970, pp. 339–347.

Kubo, "IEEE Transactions on Bio–Medical Engineering," Vol. BME–17, No. 2, Apr. 1970, pp. 163–166.

Geddes et al., "American Journal of Medical Electronics," Jan.–Mar., 1962, pp. 62–69.

*Primary Examiner*—William E. Kamm
*Attorney, Agent, or Firm*—Russell E. Schlorff; John R. Manning; Marvin F. Matthews

[57] ABSTRACT

This invention relates to multi-channel, subject monitoring systems and especially to such medical monitoring systems allowing the monitored subject freedom of movement. Many types of sensors may be employed and differently arranged. The outputs of the sensors are suitably amplified and conditioned to provide the necessary voltage levels for the multiplexers in the analog-to-digital (A/D) converters. The measured phenomena are displayed at a remote monitoring and control station. The entire system includes a bio-belt linked by optically coupled transmission and reception links to a data acquisition unit (DAU) having a central station function of controlling and displaying the output from the bio-belt.

6 Claims, 6 Drawing Figures

MEDICAL SUBJECT MONITORING SYSTEMS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 45 U.S.C. 2547).

BACKGROUND OF THE INVENTION

Conventional physiological gathering systems typically include suitable bio-medical transducers adapted to collect physiological data generally consisting of four variables routinely measured, namely, temperature, blood pressure, pulse (heart rate), and respiratory rate. Temperature is usually measured with a thermistor. The other variables can be measured with various types of transducers commonly known as sensors including "dry" or "wet" electrodes attached to the patient's body.

Preferred body transducers and methods for mounting them on the subject's body are described in U.S. Pat. No. 3,409,007. Suitable flexible electrical conductors leading from each of the transducers are made to terminate in a connector.

While such known systems are satisfactory in many respects they do have certain drawbacks chief among which are: they present a hazard to the subject, the monitored signals are inadequately conditioned prior to being multiplexed, they unduly limit the subject's freedom of movement, and they are relatively inflexible for applications such as space crafts, wherein modular construction is of the utmost importance.

SUMMARY OF THE INVENTION

The physiological monitoring system of this invention is of modular construction. The modules are mounted on a flexible belt designed with pockets that hold signal-conditioning and battery modules. The belt is worn on the subject's waist. A connector in one module receives the sensors' connector. To reduce the susceptibility of the sensors' lead wires to picking up noise, signal-conditioner modules having pre-amplifiers and amplifiers are located on the belt to be close to or directly on the dry electrodes. To achieve a reduction in size and of power consumption, micro-electronics are employed whenever possible.

The measured analog signals are sampled and then converted into digital form for transmission via an umbilical cord linking the bio-belt with the data acquisition unit (DAU). The cord avoids the usual problems associated with bio-medical sensors in environments which are rich in noise interference, such as space ships.

The common or ground wire of the system comprising the electronic instruments is fully isolated from the monitored subject without sacrificing the quality of the monitored and/or signals in the data acquisition unit. Two optical couplers are employed to achieve such isolation for the bio-belt/DAU interface.

Although the system will be described in connection with a single subject being monitored, it can readily be adapted to a multi-subject monitoring system on a time sharing basis.

BRIEF DESCRIPTION OF THE DRAWINGS

Throughout the drawings, the same reference characters are used to designate the same or similar parts.

FIG. 1 shows the hardware implementation of the micro-miniaturized biomedical monitoring, control, and display system of this invention, generally designated as 10. System 10 includes a bio-belt unit 12, a transmission line or umbilical cord 13, and a data acquisition unit 14.

Figure 1:
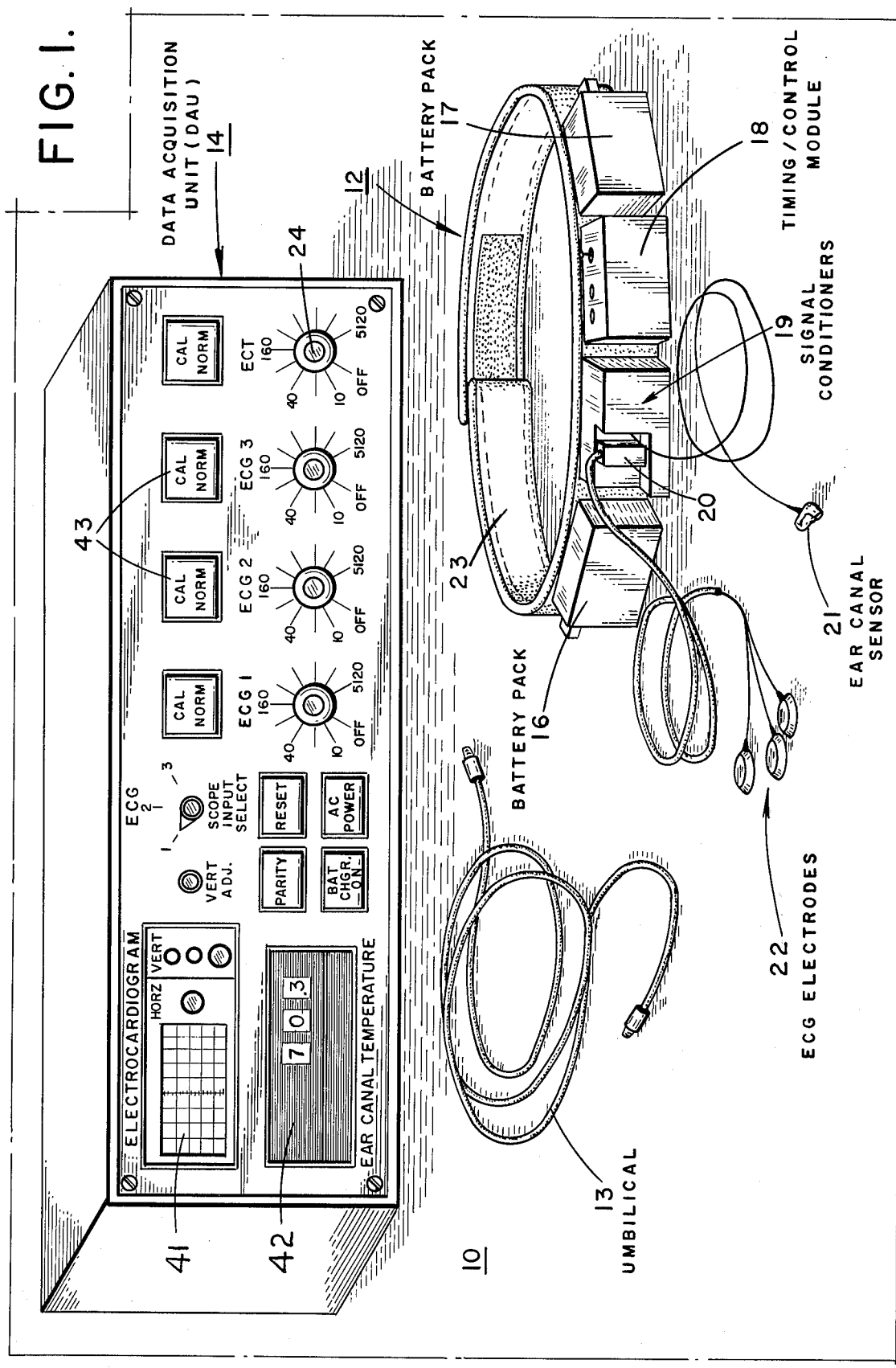
FIG. 1 is a pictorial representation of the system hardware of this invention

Belt unit 12 supports two rechargeable battery modules 16, 17, a timing-control module 18, and signal conditioner modules 19 having a female electrode connector 20. The transducers comprise an ear canal sensor 21, and a plurality of ECG electrodes 22. The umbilical cord 13 interconnects the bio-belt with the data acquisition unit 14. Cord 13 provides two-way communication for PCM serial control and data signals between units 12 and 14.

The belt is preferably made of a polybienzimidizole fabric with Velcro hook material and Velcro pile. The bio-belt is worn around the subject's waist where it is held in place by slight pressure provided by adjusting the overlapping sections of the Velcro closure material for a comfortable fit. The batteries are rechargeable nickel-cadmium batteries.

In general, the ECG electrodes 22 acquire information needed for electrocardiograms, and sensor 21 monitors the temperature in the ear canal of a subject. The bio-belt electronics contain signal conditioners, signal multiplexing units, and data transmission circuits. The hardware of the data acquisition unit (DAU) 14 contains sampling-rate selection switches 24, other essential controls, and provides data displays for the ear canal temperature 42 and the electrocardiogram 41.

Figure 2:
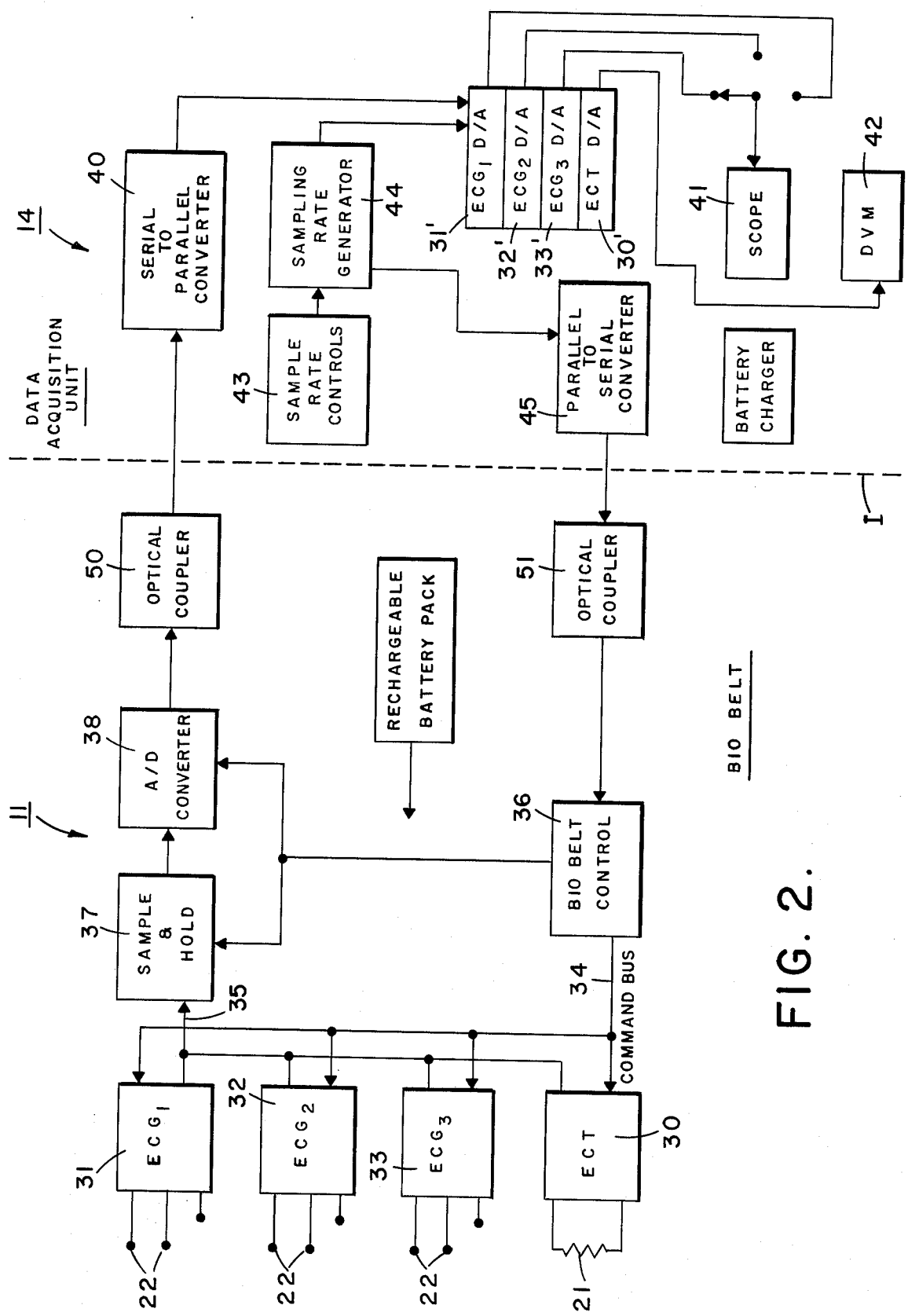
FIG. 2 is a simplified block diagram of the entire electronic system.

The entire bio-medical system 10 is shown in FIG. 2 in generalized block form. It can collect from one ear canal temperature (ECT) channel 30 and from several electrocardiogram (ECG) channels, only three of which 31–33, are shown. Each of channels 30–33 is addressed by a control network 36 via a command bus line 34 and delivers its output to a signal bus line 35.

Control network 36 also delivers the command information into a sample-and-hold network 37 followed by an A/D converter 38 which converts the analog signal data into serial binary data.

In data acquisition unit 14, a converter 40 converts this serial binary data to parallel binary data. There is provided, for each of transmitting channels 30–33, corresponding receiving and digital-to-analog conversion channels 30'–33'. Sample rate controls 43 control the output of a sampling rate generator 44 which feeds a parallel-to-serial converter 45. The reconverted monitored (ECG) analog data is selectively displayed on an electrocardiogram scope 41, and the ECT data is displayed on a digital voltmeter 42.

Complete electrical isolation from the common wires in the data acquisition unit 14 is achieved in both directions, at the interface I, by using two optical couplers 50 and 51. In each such optical coupler, the current flows through a diode (not shown) which emits photons on the infra-red spectrum. This radiation is guided in the same housing to a corresponding photo-diode which gives out an output current corresponding to the input current. The two diodes are separated from each other in the same enclosure by an excellent electrical insulator. Optical couplers, per se, are well known to the art.

Figure 3:
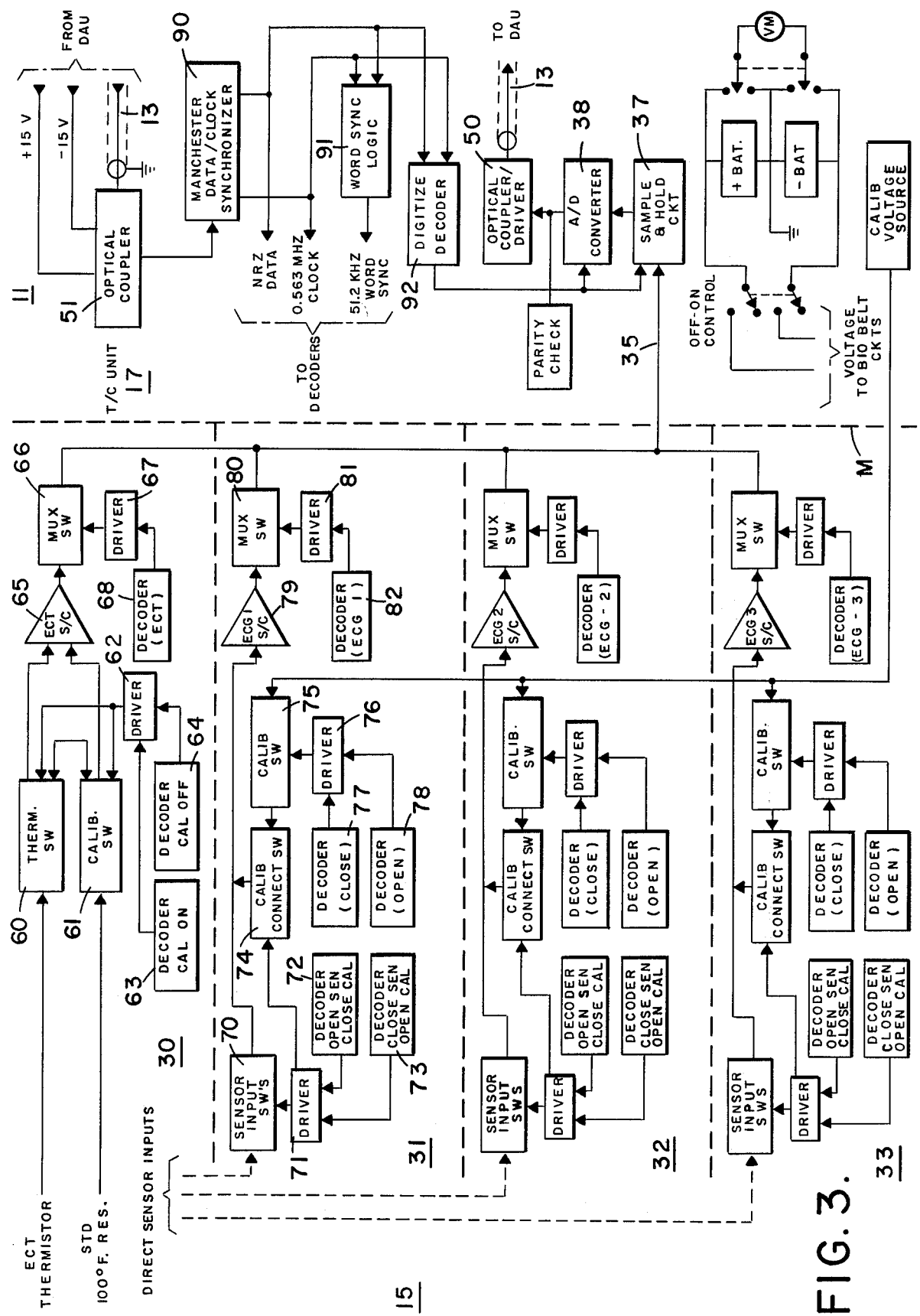
FIG. 3 is a detailed block diagram of the bio-belt sub-system.

The bio-belt subsystem, generally designated as 11, is shown in greater detail in FIG. 3. It is subdivided by a vertical dotted line M into a signal conditioner and receiver unit 15 and a command unit 17. The ECT channel 30 includes a thermistor switch 60, a calibration switch 61, and a driver 62 for driving these switches. Driver 62 receives its energizing signals from a calibration ON decoder 63 and from a calibration OFF decoder 64. Switch 60 receives its input from the ECT thermistor, and switch 61 receives its input from a temperature insensitive FET with an equivalent resistance of 100°F. The outputs from switches 60 and 61 are applied to an ECT amplifier 65 whose output is multiplexed by a switch 66 driven by a driver 67 which is controlled by a decoder 68.

Since the ECG-1, ECG-2 and ECG-3 channels are identical, the description of only one (ECG-1) channel 31 will therefore be sufficient.

Each ECG channel such as 31 includes a sensor input switch 70 driven by a driver 71 which is controlled by an OPEN-sensor, CLOSE-calibration decoder 72 and by a CLOSE-sensor, OPEN-calibration decoder 73. Driver 71 also activates a calibration connect unit 74, which couples a calibration signal switch 75. Switch 75 is driven by a driver 76, controlled by a CLOSE decoder 77 and by an OPEN decoder 78. The output from the sensor input switch 70 or from the calibration switch 75 is applied to an amplifier 79, the output of which is fed through a multiplexer switch 80 driven by a driver 81 controlled by a decoder 82.

The multiplexed information from all channels 30–33 is applied to bus line 35 which feeds sample-and-hold circuit 37 followed by A/D converter 38. The output of converter 38 is applied to optical coupler 50 which electrically isolates the data acquisition unit (DAU) 14 from the bio-belt unit 12 in the transmission mode of the umbilical cord 13.

With reference to FIGS. 1 and 3, in the receiving mode of cord 13, optical coupler 51 isolates the DAU 14 from the bio-belt unit 12. Coupler 51 feeds a data clock synchronizer 90 preferably of the Manchester type. The logic circuitry in the timing-control unit 18 includes a word synchronizer logic network 91 and a digitize decoder 92 to allow the decoders in the data receiver unit 15 to receive: NRZ data, a clock signal, and word sync signals.

Figure 5:
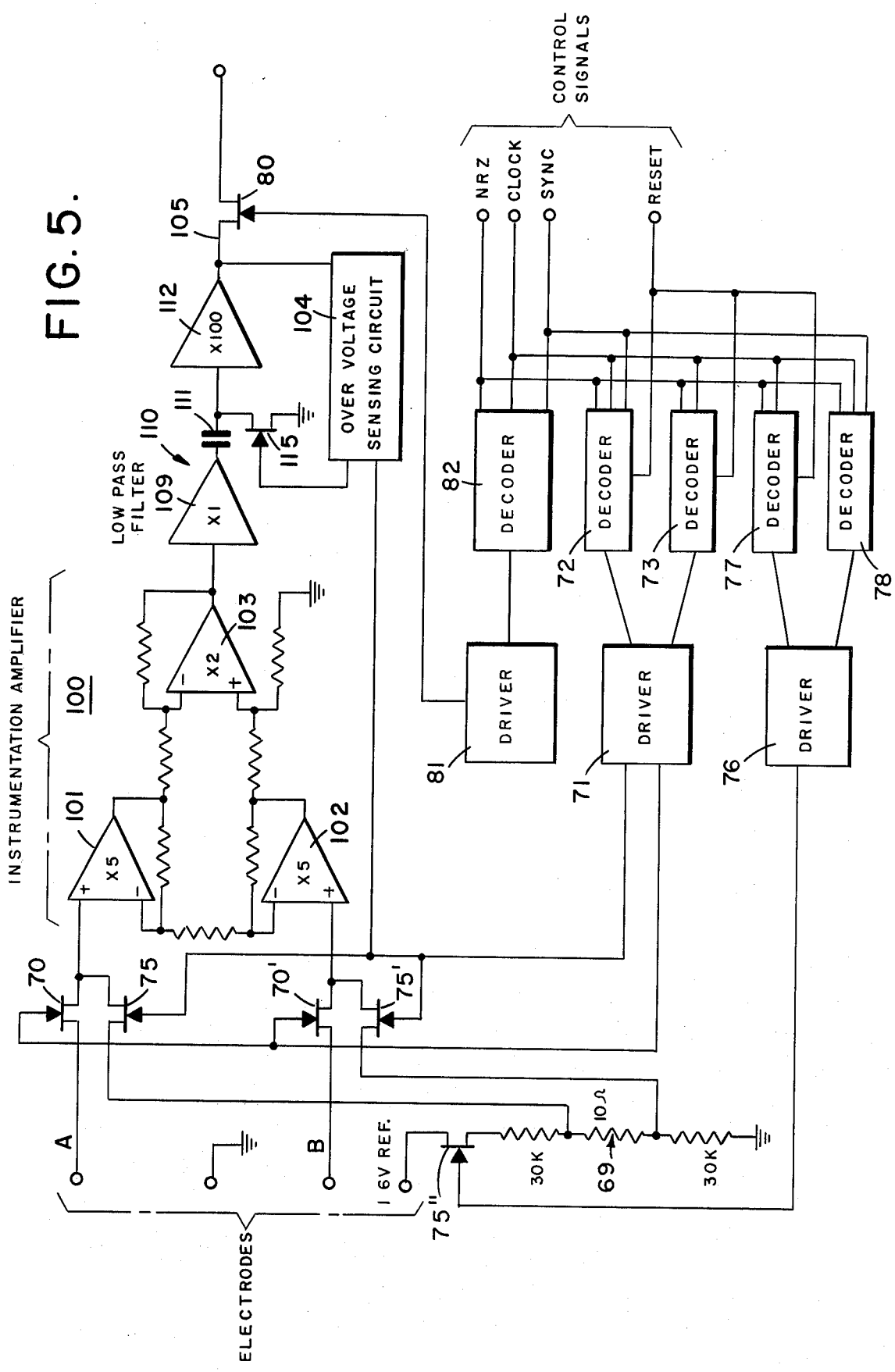
FIG. 5 is a block diagram of the ECG signal conditioner.

The operation of each ECG data receiver and signal conditioner channel will be better understood with reference to FIGS. 3 and 5. It includes an instrumentation amplifier 100 having differential, operational amplifiers 101–103. Each of amplifiers 101, 102 has a gain of 5, and amplifier 103 a gain of 2, giving a total gain of 10 to the instrumentation amplifier 100. An over-voltage sensing circuit 104 resets the output line of amplifier 103 when it exceeds ±5 volts.

During normal operation of the ECG signal conditioner, input FET switches 70, 70' in the electrode input lines A and B, respectively, are open while calibrate FET switches 75, 75' and 75'' are closed.

In the signal transmission mode, the low-level ECG signal is amplified ten times by the differential input amplifier system 100 whose output passes through a low-pass filter 110 having an amplifier 109 and a capacitor 111. The output of filter 110 is applied to output amplifier 112 whose gain is 100. In the preferred system, the total gain of each ECG signal conditioner channel was 1,000 and its frequency response 0.1–450Hz±0.5db.

The output signal on line 105 from output amplifier 112 passes through multiplexer FET switch 80 whose ON or OFF condition is controlled by decoder 82 through driver 81. When the voltage on line 105 drifts or is abruptly shifted off scale by a voltage transient on the electrode lines A and B, such abrupt changes will be detected by the over-voltage sensing circuit 104 which will operate an FET switch 115 for the purpose of grounding the output of coupling capacitor 111. The grounding action is controlled by a one-shot multivibrator (not shown) in circuit 104. The vibrator has a one second period and, consequently, for that one second period there will be no output from amplifier 112.

In the calibrate mode, when an ECG signal channel is properly addressed by the data acquisition unit 14, the FETs 70, 70' on the electrode input lines A and B, will be turned OFF and the calibrate FETs 75, 75' and 75'' will be turned ON. Simultaneously, the coupling capacitor 111 is dumped to ground to restore the base line 105.

The decoders are addressed by the control signals as indicated in FIG. 5. The control of FET switch 80 is accomplished by decoder 82. Decoder 78 switches on the reference +6 volts so that it becomes applied to the calibrate, divider network 69 consisting of two 30K resistors and one 10-Ohm resistor. In this fashion a 1 millivolt signal will appear on the electrode input lines A and B.

Figure 6:
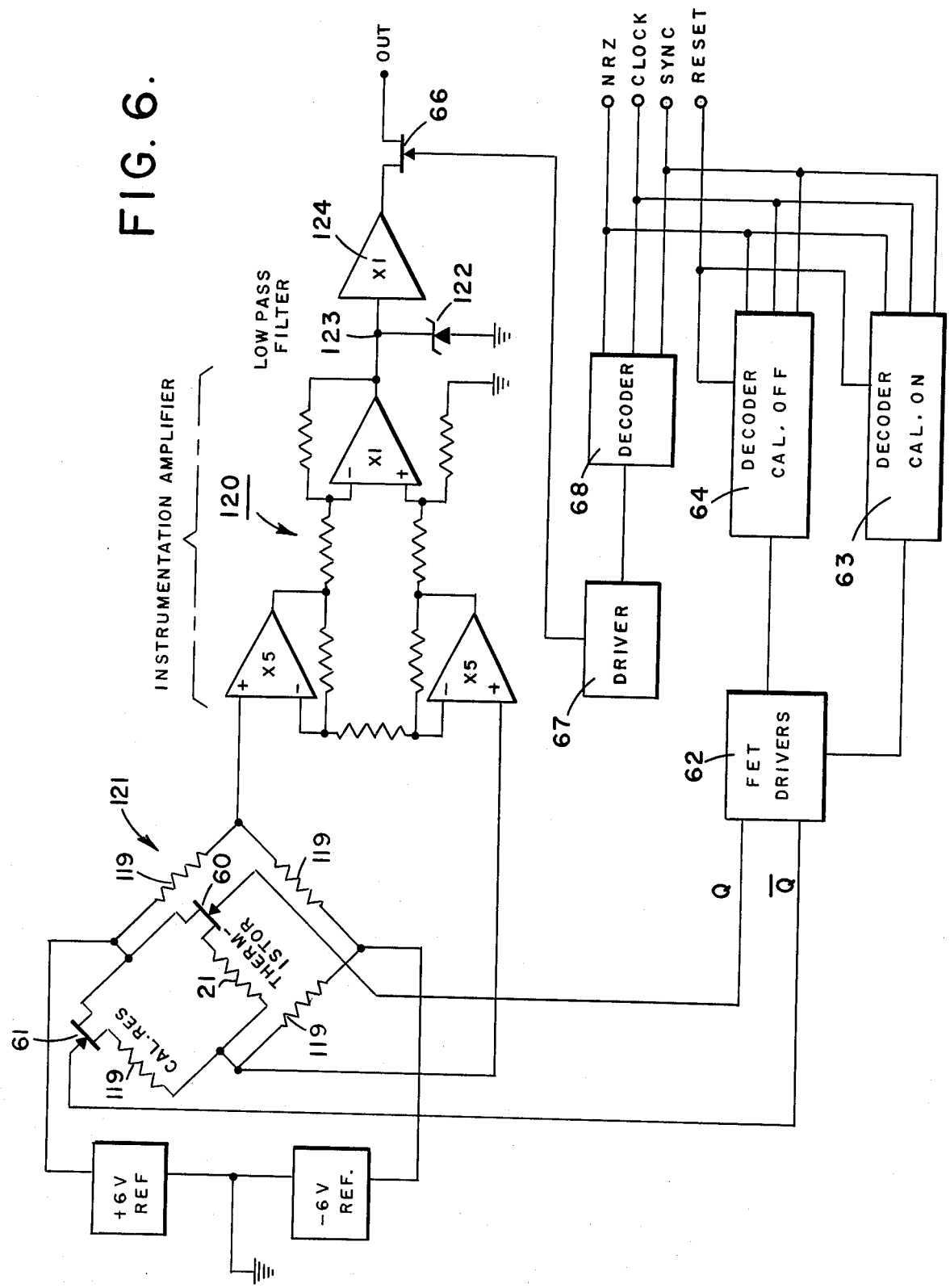
FIG. 6 is a block diagram of the ECT signal conditioner.

The ECT signal channel will now be explained with reference to FIGS. 3 and 6. It is similar to the circuit shown in FIG. 5.

In the signal transmission mode, it includes a differential input amplifier 120 which receives its input signals from a thermistor bridge 121. In order to obtain a high degree of precision in the temperature measurement, the bridge circuit 121 is powered by ±6 volts reference source which is virtually insensitive to environmental changes. The bridge circuit itself includes thermistor 21 and four calibrate resistors 119 each having a low-temperature coefficient. The output signals from bridge 121 are amplified by the high-input impedance amplifier 120 whose output 123 is precluded by a Zener diode 122 from falling below −0.5 volts or becoming greater than +6.8 volts. The output signal from terminal 123 is passed through a unity-gain active filter 124 and into multiplexer FET switch 66.

In the calibrate mode of the ECT channel, FET switch 60 is turned OFF and FET switch 61 is turned ON. This gives to the bridge an equivalent resistance equal to that produced in the thermistor at 100°F. The calibrate function is controlled through decoder 63.

Figure 4:
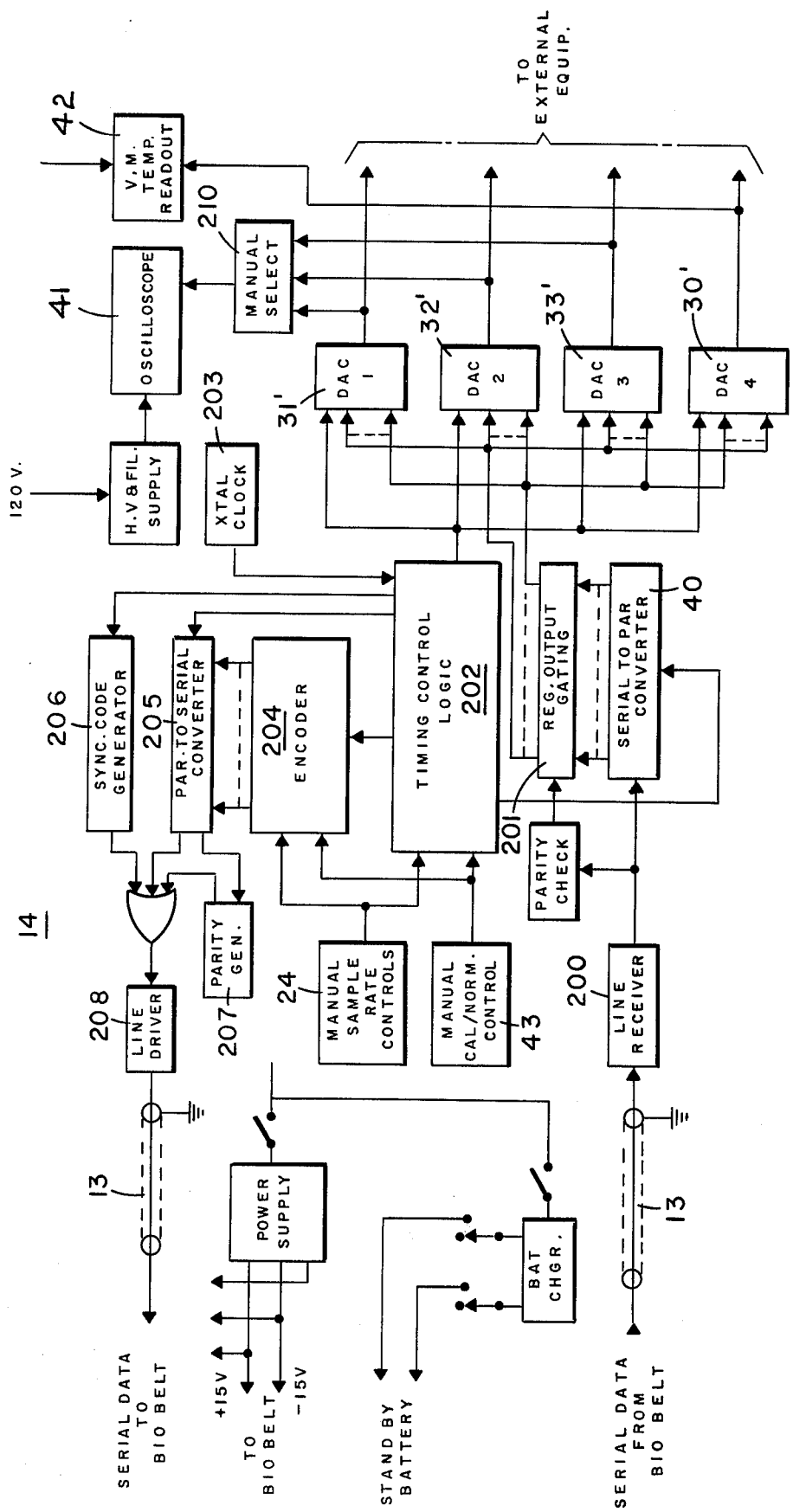
FIG. 4 is a block diagram of the data acquisition unit sub-system.

Referring now to FIGS. 2 and 4, the addressable multiplexer capability is obtained by word frames which are generated in the data acquisition unit 14 and are coded for transmission to the bio-belt 12. The word frames contain the commands for sequentially multiplexing the outputs of the signal channels at selected rates, as well as the commands for the signal conditioners' calibrate circuits. The various rates can be preselected with the rate selector switches as shown on the front panel of the DAU unit 14 in FIG. 1.

A signal channel in signal receiver subsystem 15 (FIG. 3) does not become active until it is interrogated by the logic circuitry in the data acquisition unit 14 and signaled to transmit its data for decoding and display. During normal operation, each of the signal channels is interrogated in turn for a prescribed time interval by a coded message addressed by the timing control logic of the data acquisition unit 14. No data is acquired from a signal channel without a request or an interrogation from the data acquisition unit. The signals or binary words required to interrogate the signal channels are generated, coded and transmitted at preselected rates.

In FIG. 4, the output from the optical coupler 50 is received by a line receiver 200 and applied to serial-to-parallel converter 40 whose output is fed to a regulated output gating network 201 which applies parallel binary data simultaneously to the inputs of the digital-to-analog converters 30'–33'. The application of the parallel binary data to the digital-to-analog converters is controlled by a timing control logic network 202 which receives a reference frequency signal from a crystal clock 203 and converts it into the properly coded messages for operating the decoders in the bio-belt's logic circuits.

The desired requests are encoded by an encoder 204 which is controlled by manual sample rate controls 24 (FIG. 1) or by the manual calibrate-normal controls 43. The encoded words are in binary parallel form and become converted into serial form by a parallel-to-serial converter 205. The serial information is suitably synchronized by a sync code generator 206 and a parity generator 207. By using the Manchester code one obtains the advantage of permitting data to be sent twice the rate of normal digital data since the rise and fall of each square wave can represent a data element rather than one square wave representing one data element. Once received at the bio-belt 12, the code will be reconstructed as two signals: clock and word.

The above explains generally how word frames are timed, assembled, and coded in the data acquisition unit 14 for transmission to the bio-belt 12.

A line driver 208 feeds the encoded messages to optical coupler 51 (FIG. 3) for transmission to the bio-belt control logic 36 (FIG. 2). The output of each of the ECG D/A converters 31'–33' is selected by a manual selector switch 210 for application to oscilloscope 41. The timing control logic 202 will send an address unique to only one of the possible channels and when this address is decoded as a valid command by the addressed decoder, the signal channel's operations will initiate in a manner previously described. The addressed messages are serially shifted out and transmitted through the umbilical cord 13 to the bio-belt's subsystem 11 (See FIG. 2). The operation of the latter was explained above.

HARDWARE AND PREFERRED MODE OF OPERATION

The microminiaturized bio-medical monitoring system of this invention primarily consists of two units, a body-worn bio-belt and a data acquisition unit. The bio-belt detects, conditions and transmits on the data signal line 35, electrocardiogram (ECG) and ear canal temperature (ECT) signals for monitoring by the data acquisition unit. The data acquisition unit generates and transmits commands on the command signal line 34 to control the bio-belt operate and calibrate modes. The sampling rates of the data signals are manually controlled.

In the preferred embodiment, the bio-belt weighs approximately 4 to 5 pounds and has four boxes mounted on it. Each box is approximately 2-½ inches high by 4 inches wide by 1-½ inches deep. The data acquisition unit is portable, weighs approximately 40 pounds, and is 5 inches high by 17 inches wide, and 17 inches deep. The data acquisition unit also contains battery rechargers shown on the drawings for the sake of completeness but not described. The umbilical cord is 15 feet long and contains the DAU ground, DAU ±15 volts DC, data and command signal lines.

As the input and output diodes in the optical couplers are isolated, not only is power supply isolation achieved between the bio-belt and the data acquisition unit, but the grounding wires are also isolated. Accordingly, the monitored subject can make single point contact to any metallic object in his vicinity without the danger of suffering an electrical shock. Whether the metallic object is at ground potential or above ground, the optical coupler will limit the flow of current to practically zero. The location of the optical couplers on the bio-belt itself is desirable from a safety standpoint: should damage occur to the umbilical cord, the subject will still be protected from shock hazards.

Parallel output connectors (not shown) at the rear end of the data acquisition unit 14 (FIG. 1) allows for connection of the signals to external display or recording equipment.

The data acquisition unit itself serves the following major functions: it generates command information for, and transmits this information to, the bio-belt, it receives digitized information from the bio-belt and reconverts this information back into analog signals; it displays the appropriate ECG analog waveforms on the miniature oscilloscope screen and presents the ECT information on the digital volt meter; it provides a battery charger to recharge the nickel-cadmium battery packs used to power the electronic circuits on the bio-belt; it provides parallel outputs for the four signal channels which permit the signals to be transmitted to, processed, displayed, stored and/or analyzed by remotely located equipment.

The scope input select switch (FIG. 1) selects one of the ECG channels for display.

The calibrate-normal switches are alternate-action, push-button switches. Each such switch when switched from normal to calibrate state will activate a 2-½ second calibration sequence at the bio-belt. Thereafter the bio-belt will resume normal operation after completion of a calibrate sequence.

The ECG and ECT switches are momentary ON push button switches. Each such switch commands the bio-belt multiplexer FET switch to sample the signal at the selected rate per second. Unused channels are shorted to ground.

The reset switch is a momentary ON push-button switch which blanks the command DAU data to the bio-belt for 0.2 seconds during which time the DAU transmits a series of zeros, thereby enabling the bio-belt to synchronize with the DAU clock and reset all ECG and ECT circuits in both the DAU and the bio-belt to their respective normal operating modes.

The parity switch is also a momentary ON switch. It extinguishes the parity light behind the switch if this light has come on because of receipt of incorrect data from the bio-belt.

The sampling rate for each signal channel is manually variable between 5,120 and 10 samples per second.

Each multiplex decoder of a signal conditioner is activated by a digital word including frame sync words. Each frame includes 20 words and each word contains 11 bits so that there are 220 bits per frame. This permits 2,560 frames per second. Since each word for activating the multiplex decoders of the signal conditioners can be sent twice in one word frame, a maximum sampling rate of 5,120 per second is possible.

The word frame format is made up as shown below in Table A. The unused words are referred to as "spares".

TABLE A

| Word | 0 | Sync 1 |
|---|---|---|
| " | 1 | Sync 2 |
| " | 2 | ECG1 |
| " | 3 | Spare |
| " | 4 | ECG2 |
| " | 5 | Spare |
| " | 6 | ECG3 |
| " | 7 | Spare |
| " | 8 | ECT |
| " | 9 | Spare |
| " | 10 | FET switch commands |
| " | 11 | Spare |
| " | 12 | ECG 1 |
| " | 13 | Spare |
| " | 14 | ECG 2 |
| " | 15 | Spare |
| " | 16 | ECG 3 |
| " | 17 | Spare |
| " | 18 | ECT |
| " | 19 | Spare |

What is claimed is:

1. A medical monitoring system for monitoring at least one physiological signal from a plurality of transducers mounted on the body of a subject being monitored, said system comprising a bio-unit, to be associated with the subject, and coupled with the transducers, a data acquisition unit, and a bidirectional coaxial cable having a signal bus and a command bus linking the bio-unit with the data acquisition unit;

said bio-unit comprising at least one signal-conditioning channel and means for controlling the output of the signal conditioning channel, a power pack for supplying power to the bio-unit, a signal conditioner for conditioning the analog signal generated by the transducer, calibration means including a standard signal for calibrating the signal conditioner, multiplexing means for sampling at selectively preselected rates for each channel the output of the signal conditioner and of the calibration means, and decoder means for driving the multiplexing means, for controlling the application of the output of the signal conditioning channel to the multiplexing means, and for controlling the application of the output of the calibration means to the multiplexing means;

an analog-to-digital converter for receiving the multiplexed analog data and converting it into digital data, means for applying the digital data to a signal bus line in said cable, means for receiving command data from a command bus line in said cable, optical couplers in said signal bus line and said command data bus to electrically isolate the subject from the data acquisition unit, synchronizing means for applying the command data to said decoder means in said signal conditioning channel, and decoding means for decoding the command data to control the operation of said analog-to-digital converter;

said data acquisition unit comprising:

a digital-to-analog converter receiving the digital data from the signal bus line and for reconverting the digital data into analog data, timing control logic means for controlling the digital-to-analog converter and for selectively generating said command data, and utilization means coupled to said digital-to-analog converter for monitoring the reconverted analog data.

2. A medical monitoring system for monitoring at least one physiological signal from a plurality of transducers mounted on the body of a subject being monitored, said system comprising a bio-unit, to be associated with the subject, a data acquisition unit, and a bi-directional coaxial cable having a signal bus line and a command data bus line linking the bio-unit with the data acquisition unit;

said bio-unit comprising a plurality of transducers and a signal-conditioning channel for each transducer and means for selectively controlling the signal conditioning channels;

a power pack for supplying power to the bio-unit, each signal conditioning channel, comprising:

a signal conditioner for conditioning the analog signal generated by the transducer, calibration means for calibrating the signal conditioner with reference to a standard signal, multiplexing means for selectively sampling at preselected rates for each channel the output of individual signal conditioning channels and of the calibration means, decoder means for driving the multiplexing means, for controlling the application of the output of the selected signal conditioning channel to the multiplexing means, and for controlling the application of the output of the calibration means to the multiplexing means;

an analog-to-digital converter for receiving the multiplexed analog data from said channels and for converting it into digital data, means for applying the digital data to a signal bus line in said coaxial cable, means for receiving command data from a command bus line in said coaxial cable, optical couplers in said coaxial cable electrically isolating the subject from data acquisition unit, synchronizing means for applying the command data to said decoder means, and decoding means for decoding the command data to control the operation of said analog-to-digital converter;

said data acquisition unit comprising:
- a plurality of digital-to-analog converters one for each channel for receiving the digital data signals from the signal bus line and reconverting the digital data into analog data,
- timing control logic means for controlling the digital-to-analog converters and for selectively generating said command data, and
- utilization means coupled to said digital-to-analog converters for monitoring the reconverted analog data.

3. A medical monitoring system for monitoring at least one physiological signal from a plurality of transducers mounted on the body of a subject being monitored, said system comprising a bio-unit, to be associated with the subject, a data acquisition unit, and a bi-directional coaxial cable having a signal bus line and command data bus line linking the bio-unit with the data acquisition unit;

said bio-unit comprising a plurality of signal-conditioning channels and means for selectively controlling the signal conditioning channels,
each signal conditioning channel comprising:
- a signal conditioner for conditioning the analog signal generated by the transducer, and
- multiplexing means for selectively sampling at preselected rates for each channel the output of the individual signal conditioner upon signal from the data acquisition unit;
- an analog-to-digital converter for receiving the multiplexed analog data from said selected channel and for converting it into digital data,
- means for applying the digital data to a signal bus line in said cable,
- means for receiving command data from a command bus line in said cable; and
- coupling means in said coaxial cable electrically isolating the bus unit from the data acquisition unit, said data acquisition unit comprising:
- a plurality of digital-to-analog converters one for each channel for reconverting the digital data into analog data,
- timing control logic means for controlling the digital-to-analog converters and for selectively generating said command data, which activates the multiplexing means and determines selectivity of sample rate of individual signal conditioning channels, and
- utilization means coupled to said digital-to-analog converter for monitoring the reconverted analog data.

4. The system of claim 3 wherein each of said first and second couplers is an optical coupler.

5. The system of claim 4 wherein each channel of said signal conditioning channels further comprising:
- a calibration means for calibrating the signal conditioner with reference to a standard signal, and
- decoder means for driving the multiplexing means, for controlling the application of the output of the signal conditioner to the multiplexing means, and for controlling the application of the output of the calibration means to the multiplexing means.

6. The system of claim 5 wherein said system further comprises:
- synchronizing means for applying the command data to said decoding means in said signal conditioning channels, and
- decoding means for decoding the command data to control the operation of said analog-to-digital converters.

* * * * *